(12) United States Patent
Belliard (10) Patent No.: US 10,647,029 B2
(45) Date of Patent: *May 12, 2020

(54) SEPARATING DEVICE FOR A MOLD COMPRISING A CHAIN OF ARTICULATED LINKS

(71) Applicant: Faurecia Interieur Industrie, Nanterre (FR)

(72) Inventor: Sylvain Belliard, Rouillon (FR)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 316 days.

This patent is subject to a terminal disclaimer.

(21) Appl. No.: 15/442,541

(22) Filed: Feb. 24, 2017

(65) Prior Publication Data

US 2017/0246770 A1    Aug. 31, 2017

(30) Foreign Application Priority Data

Feb. 26, 2016 (FR) ..................... 16 51611

(51) Int. Cl.
  *B29C 37/00* (2006.01)
  *B29C 45/40* (2006.01)
  *B29C 33/44* (2006.01)

(52) U.S. Cl.
  CPC ........ *B29C 37/0003* (2013.01); *B29C 33/442* (2013.01); *B29C 45/40* (2013.01); *B29C 45/401* (2013.01); *B29C 45/4005* (2013.01); *B29C 2045/4073* (2013.01)

(58) Field of Classification Search
  CPC . B29C 37/0003; B29C 33/442; B29C 45/401; B29C 45/40; B29C 45/4005; B29C 2045/4073
  See application file for complete search history.

(56) References Cited

U.S. PATENT DOCUMENTS

| 1,345,818 | A | * | 7/1920 | Witt | ................... F16G 13/06 305/52 |
| 3,290,724 | A | | 12/1966 | Rondum | |
| 2015/0375427 | A1 | * | 12/2015 | Hoong | .................. B29C 45/332 264/265 |

FOREIGN PATENT DOCUMENTS

| JP | H0671703 A | 3/1994 |
| JP | H06328533 A | 11/1994 |

OTHER PUBLICATIONS https://www.lexico.com/en/definition/articulate.*
French Search Report in French for application No. FR1651611, dated Nov. 11, 2016, 2 pages.

* cited by examiner

*Primary Examiner* — Peter L Vajda
*Assistant Examiner* — Asha A Thomas
(74) *Attorney, Agent, or Firm* — Reising Ethington P.C.

(57) ABSTRACT

The separating device comprises:
  an actuating device (8) translatable along a first axis (A1) between a retracted position and a separated position,
  at least one separating element (28, 60) translatable along a second axis (A2) between a retracted position and a separated position,
  a transfer device (26) connecting the actuating device (8) and the separating device (28, 60).
The transfer device (26) comprises at least two links (46), rotatable relative to one another and relative to the actuating device (8) and the separating element (28, 60), and a guide element (36) receiving said links (46), said links being moved along a movement path by the actuating device (8) and moving the separating element (28, 60).

11 Claims, 5 Drawing Sheets

SEPARATING DEVICE FOR A MOLD COMPRISING A CHAIN OF ARTICULATED LINKS

The present invention relates to a separating device for a mold used to produce a molded article in a molding cavity intended to allow the separation between at least one part of the molded article and at least one part of said molding cavity, said device comprising:

- an actuating device translatable along a first axis between a retracted position and a separated position,
- at least one separating element translatable along a second axis, different from the first axis, between a retracted position and a separated position,
- at least one transfer device connecting the actuating device and the separating element, said transfer device being arranged to move the separating element along the second axis between its retracted position and its separated position when the actuating device is moved along the first axis between its retracted position and its separated position.

In a mold for producing a molded part, such as an injection mold, the molded part is removed from the mold, for example using a gripping tool, when the molding cavity is opened. In order to facilitate this removal, it is provided to separate the molded part from the part of the mold on which the molded part rests using a separating device or ejection device.

Such an ejection device generally comprises an ejection plate, movable in a hollowed out space of the part of the mold in a direction corresponding to the ejection direction of the part, and one or several ejection rods secured to the ejection plate and emerging in the wall of the part of the mold against which the molded part is applied. By moving the ejection plate in the ejection direction, the ejection rods push the molded part so as to separate it from the wall of the part of the mold, which allows the subsequent removal of the molded part. The use of several rods is particularly interesting when the molded part has a large surface area, since these rods can be distributed on this surface in order to push the part into different parts thereof and avoid deformations and/or breaks of the part during its ejection. Using an ejection plate makes it possible to move all of the rods at the same time using a single actuating device of the ejection plate.

However, in such a separating device, the rods are movable only in a single ejection direction, which limits the possibilities for ejection paths. Such a limitation may be problematic for parts having complex shapes, for example when these parts are not planar and have areas extending in one or several planes different from a plane perpendicular to the ejection direction or when they comprise elements protruding in a direction different from the ejection direction.

Moreover, the ejection plate must have a sufficient size to receive all of the rods, which requires providing a hollowed out space with a corresponding size in the part of the mold. However, the larger this space is, the more fragile the part of the mold in which it is formed is. This may be particularly problematic in an injection mold, in which the part of the mold must be able to withstand the injection pressure of the material injected in the molding cavity. Without such strength, the molding cavity can be deformed during the injection and thus produce parts that are not compliant with what is desired.

Moreover, the arrangement of the rods in the part of the mold can be complicated by the presence of additional elements provided in the mold. For example, heating elements or circulation channels for a heat transfer fluid can be provided in the mold. The choice of the arrangement of the rods is then limited so as not to interfere with these elements, which can be problematic to support certain areas of the part during the ejection.

A problem also arises when a complementary molding element intended to form a complementary element on the molded article, such as a screwing shaft or the like, must be separated from the complementary element of the molded article before the molded article can be removed from the molding cavity. Such a problem in particular arises when the shape of the complementary article does not allow the molded article to be ejected by simply actuating an ejection device.

One of the aims of the invention is to overcome the aforementioned drawbacks by proposing a separating device offering greater layout freedom while being less bulky, even for large parts to be molded or parts comprising one or several complementary elements formed by one or several complementary molding elements.

To that end, the invention relates to a separating device of the aforementioned type, wherein the transfer device comprises at least two links, rotatable relative to one another and relative to the actuating device and the separating element, and a guide element receiving said links, said links being moved along a movement path in said guide element by the actuating device and moving the separating element, said links being guided in said guide element over the entire movement path.

The transfer device makes it possible to modify the separating direction of the separating element by choosing a second axis that is inclined relative to the first axis. Thus, as an example, the separating device may comprise one ejection rod ejecting the part along a first axis and another ejection rod forming the separating element and ejecting the part along the second axis, which makes it possible to eject parts with complex shapes. The transfer device also makes it possible to offset the second axis relative to the first axis, i.e., to position the second axis at a distance from the first axis without having to enlarge the space necessary to move the separating device along a first axis. Thus, in the case of an ejection plate forming the separating device, the size of the space hollowed out in the part of the mold can be reduced such that the robustness of the part of the mold is increased and allows the part of the mold to withstand high injection pressures. The transfer device may also be used to bypass additional elements provided in the mold part, which makes it possible to position the separating element as desired irrespective of the structure of the mold part. The separating device can also advantageously be used when the separating element is a complementary molding element intended to form a complementary element on the molded article.

According to other features of the separating device according to the invention:
- the links are identical to one another;
- the transfer device is arranged so that a movement of the actuating device by a given distance along the first axis causes a movement of the separating element by a same distance along the second axis;
- the guide element comprises at least two opposite walls each extending over the movement path;
- the links comprise two opposite surfaces, said opposite surfaces respectively being in permanent contact with an opposite wall of the guide element over the entire movement path such that the links are guided in said guide elements over the entire movement path;

the first axis and the second axis are substantially parallel to one another or form a non-zero angle relative to one another;

the guide element comprises an upstream segment extending along an axis substantially parallel to the first axis, a downstream segment extending along the second axis and an intermediate segment extending along a substantially rectilinear and/or curved path between the upstream segment and the downstream segment;

each link comprises two flanks and a hinge pin, the hinge pin of one link being received between the two flanks of another link and being articulated to said flanks so as to allow said links to rotate relative to one another;

the actuating device comprises at least one ejection plate and an actuating rod secured at one of its ends to said ejection plate, the opposite end of said actuating rod being articulated to one of the links of the transfer device;

the separating device comprises a plurality of actuating rods secured to the ejection plate, a plurality of separating elements and a plurality of transfer devices connecting said plurality of separating elements to said plurality of actuating rods;

the separating element is an ejection element intended to allow the molded article to be ejected outside the molding cavity; and the separating element is a complementary molding element defining part of the molding cavity in the retracted position and intended to form a complementary element on the molded article, said complementary molding element being separated from said complementary element of the molded article in the separated position of the separating element.

The invention also relates to a mold comprising a first mold part and a second mold part, each comprising a molding surface and movable relative to one another between an open position, in which the second mold part is separated from the first mold part, and a closed position, in which the molding surfaces of the first and second mold parts define a molding cavity between them assuming the shape of the part to be molded, said mold comprising a separating device as described above integrated into the first mold part, the separating element forming part of the molding cavity in the retracted position and extending protruding or withdrawn from the molding surface of the first mold part along the second axis in the separated position.

Other aspects and advantages of the invention will appear upon reading the following description, provided as an example, and done in reference to the appended drawings, in which.

Figure 1:
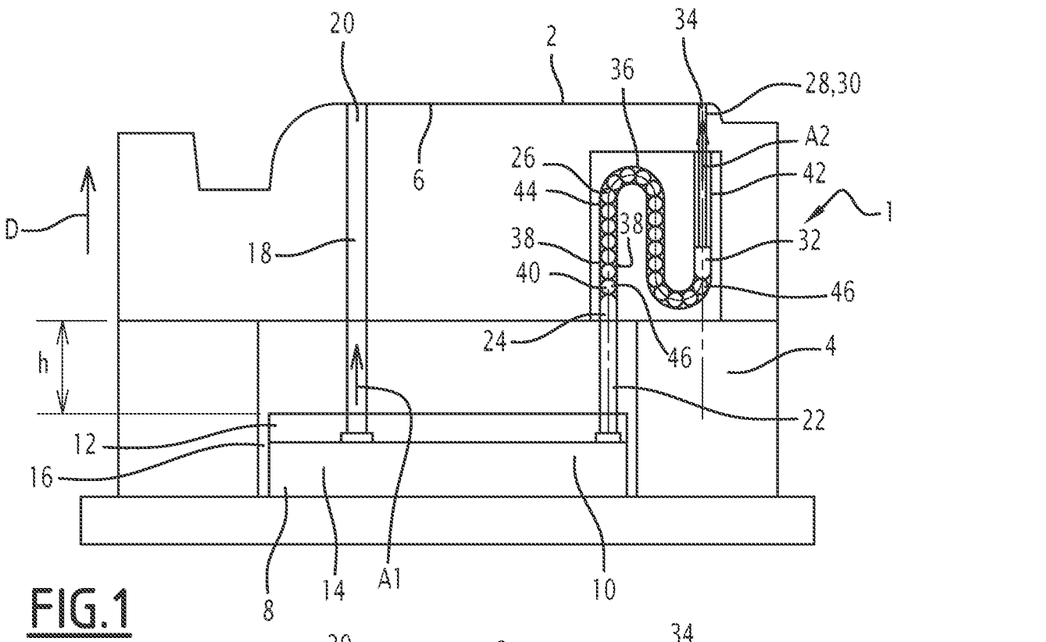
FIG. 1 is a diagrammatic sectional illustration of a first mold part comprising a separating device according to one embodiment of the invention, said device being in the retracted position.

In reference to FIG. 1, a mold 1 is described for producing a molded article 2 that may have any shape suitable for being molded. The molded article 2 is for example a motor vehicle part or the like.

The production mold 1 comprises a first part 4 and a second part (not shown in order to simplify the figures), movable relative to one another between an open position, in which the first and second parts are separated from one another, and a closed position, in which the first and second parts are close to one another so as to define a closed molding cavity. The molding cavity has a shape complementary to the shape of the molded article 2 to be produced. The movement from the closed position to the open position is done along an opening direction D, shown in the figures. The first part comprises a molding surface 6 defining, with a molding surface of the second part, the molding cavity when the first and second parts are in the closed position.

The production mold 1 is for example an injection mold arranged to inject a plastic material at a predetermined pressure in the molding cavity. To that end, the production mold 1 comprises all of the means making it possible to perform and control this injection and the formation of the part, such as one or several injection nozzles for the plastic material, means for regulating the temperature of the molding cavity, means for actuating and moving the first and second parts of the production mold 1, etc. Such means being known, they will not be described in more detail here.

Figure 7:
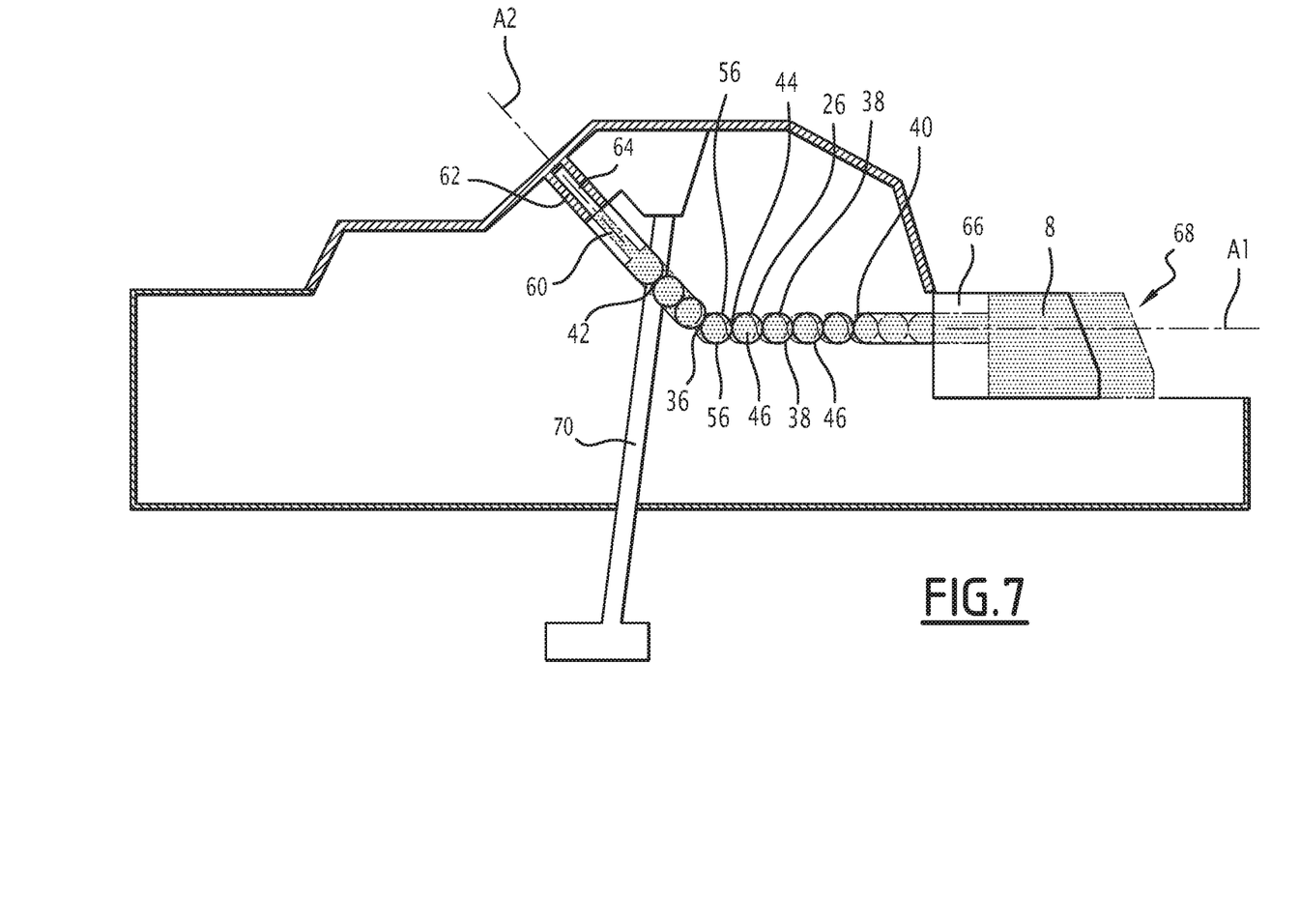
FIG. 7 is a diagrammatic sectional illustration of a first mold part comprising a separating device according to another embodiment of the invention, said device being in the retracted position in solid lines and in the separated position in dotted lines.

The production mold 1 comprises a separating device arranged to facilitate the separation between at least part of the molded article 2 and at least part of the molding cavity after the molded article has been produced. Once the molded article 2 has been produced, the first and second parts of the mold are moved into the open position. The molded article 2 is then found against the molding surface 6 of the first part 4, as shown in FIG. 1, and the separating device is arranged either to separate the molded article 2 from the molding surface 6, as shown in FIG. 2, in order to allow the molded article 2 to be grasped to remove it from the mold, or to separate a complementary molding element from a complementary element formed on the molded article, as shown in FIG. 7.

The description will now be done in the context of a separating device forming a device for ejecting the molded article, such a device being arranged to separate the molded article 2 from the molding surface 6 in order to allow the molded article 2 to be grasped to remove it from the mold.

Figure 2:
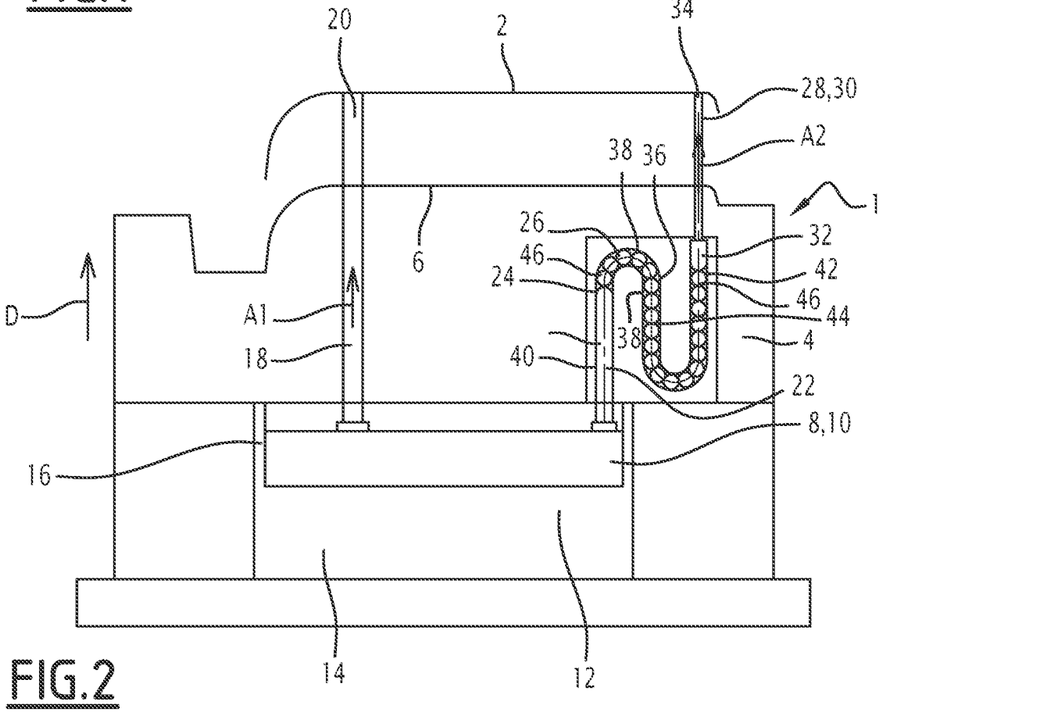
FIG. 2 is a diagrammatic sectional illustration of the first part of the mold of FIG. 1, the separating device being in the separated position.

The separating device comprises an actuating device 8 movable in the first part 4 along a first axis A1 between a retracted position, shown in FIG. 1, and a separated position, shown in FIG. 2. The first axis A1 is for example substantially parallel to the opening direction D such that, in the separated position, the molded article 2 is separated from the molding surface 6 in the space between the first part 4 and the second part of the mold.

The actuating device 8 comprises at least one ejection plate 10 arranged, translatably along the first axis A1, in a space 12 of the first part 4. In the retracted position, the ejection plate 10 is arranged in an upstream part 14 of the space 12, i.e., the part of the space 12 furthest from the molding surface 6, and in the separated position, or ejection position, the ejection plate 10 is arranged in a downstream part 16 of the space 12, i.e., the part of the space 12 closest to the molding surface 6.

According to one embodiment, the actuating device 8 further comprises at least one first ejection rod 18 arranged to move the molded article 2 along the first axis A1. The first ejection rod 18 extends along the first axis A1 from an end secured to the ejection plate 10 to a free end 20 traversing the first part 4 of the mold of the space 12 on the molding surface 6. The first ejection rod 18 is therefore translatable along the first axis A1 with the ejection plate 10 between a retracted position, in which the free end 20 is flush with the molding surface 6 and forms part of this molding surface, as shown in FIG. 1, and a separated position, in which the free end 20 protrudes from the molding surface 6 along the first axis A1 so as to separate the molded article 2 from the molding surface 6, as shown in FIG. 2. According to one embodiment and in a known manner, the actuating device 8 can comprise several first ejection rods 18 distributed on the ejection plate 10 so as to allow the molded article 2 to be ejected in several locations thereof.

The dimension h extending between the ejection plate 10 in the retracted position and the downstream part 16 of the space 12 is substantially equal to the distance by which one wishes to separate the molded article 2 from the molding surface 6 along the first axis A1.

The actuating device further comprises at least one actuating rod 22 extending along an axis parallel to the first axis A1 from an end secured to the ejection plate 10 to an opposite end, called actuating end 24, connected to a transfer device 26 in turn connected to a separating element. In the case of a separating device forming an ejection device, the separating element is an ejection element 28, as shown in FIGS. 1 to 6.

The ejection element 28 extends along a second axis A2, different from the first axis A1. The ejection element 28 is for example formed by a second ejection rod 30 comprising an actuating end 32 connected to the transfer device 26 and a free end 34, flush with the molding surface 6 and forming part of this molding surface in the retracted position of the actuating device 8, as shown in FIG. 1, and protruding from the molding surface 6 along the second axis A2 so as to separate the molded article 2 from the molding surface 6 along this second axis A2, as shown in FIG. 2.

Figure 6:
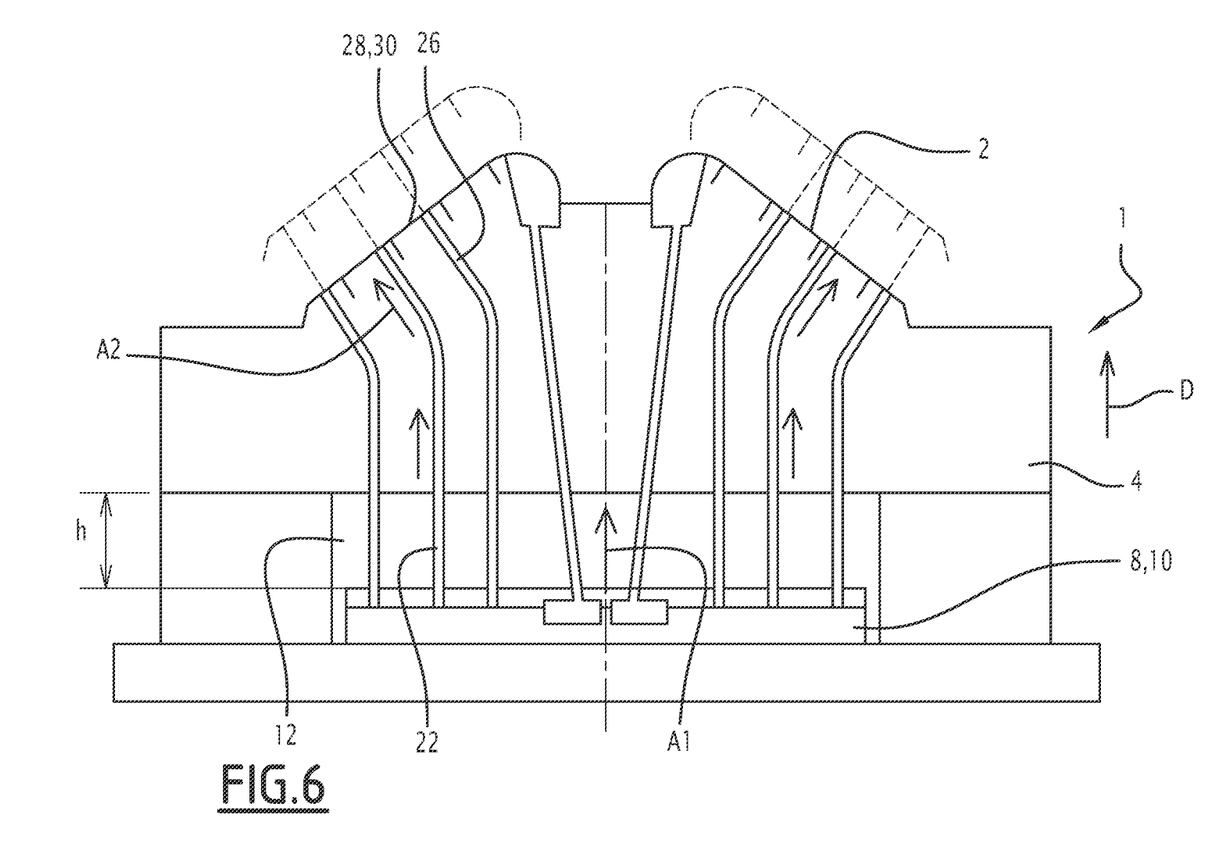
FIG. 6 is a diagrammatic sectional illustration of a first mold part comprising a separating device according to another embodiment of the invention, said device being in the retracted position in solid lines and in the separated position in dotted lines.

The second axis A2 can be substantially parallel to the first axis A1, as shown in FIG. 1 to 4, or can be inclined relative to the first axis, i.e., form a non-zero angle with the first axis, as shown in FIG. 6.

Thus, the second ejection element 28 is movable between a retracted position and a separated position, respectively when the actuating device 8 is in the retracted position and in the separated position via the transfer device 26, which is arranged to convert the movement of the actuating device 8 along a first axis A1 into movement of the ejection element 28 along the second axis A2, as will now be described.

The transfer device 26 comprises a guide element 36 extending in the first part 4 of the mold between the space 12 and the molding surface 6 along a path adapted to the arrangement of the first part 4, as will be described later. The guide element 36 is for example formed by a groove or guideway extending in the first part 4 and comprising two opposite walls 38 each extending along the path followed by the guide element 36, as more particularly visible in FIGS. 3 and 4. The guide element 36 comprises an upstream segment 40 extending near the space 12 along an axis substantially parallel to the first axis A1, emerging in this space 12 and able to receive at least part of the actuating rod 22 at least in the separated position, as shown in FIG. 2. The guide element 36 also comprises a downstream segment 42 extending near the molding surface 6 along the second axis A2, emerging in this molding surface 6 and able to receive at least part of the second ejection rod 30 at least in the retracted position, as shown in FIG. 1. The guide element 36 comprises, between the upstream segment 40 and the downstream segment 42, an intermediate segment 44 extending along a rectilinear and/or curved path adapted to the arrangement of the first part 4, as will be described later.

The transfer device further comprises at least two articulated links 46, one of which is articulated to the actuating device 8 and the other of which is articulated to the ejection element 28. The links 46 are thus rotatable relative to one another and relative to the actuating device 8 and the ejection element 28. The rotation axes are substantially parallel to one another and substantially perpendicular to a plane containing the first axis A1 and the second axis A2.

The number of links 46 of the transfer device 26 depends on the path followed by the guide element 36 and is arranged so that the links connect the actuating device 8 to the guide device 28. More particularly, the links 46 connect the actuating end 24 of the actuating rod 22 to the actuating end 32 of the second ejection rod 30. Thus, the transfer device 26 may comprise more than two links 46, including two end links respectively articulated to the actuating end 24 of the actuating rod 22 and the actuating end 32 of the second ejection rod 30 and at least one intermediate link articulated to the two end links or several intermediate links successively articulated to one another so as to form a chain of links 46 extending in the guide element 36 between the actuating end 24 of the actuating rod 22 and the actuating end 32 of the second ejection rod 30.

All of the links 46 are identical, i.e., they have an identical shape and structure, whether they are end links or intermediate links.

Figure 5:
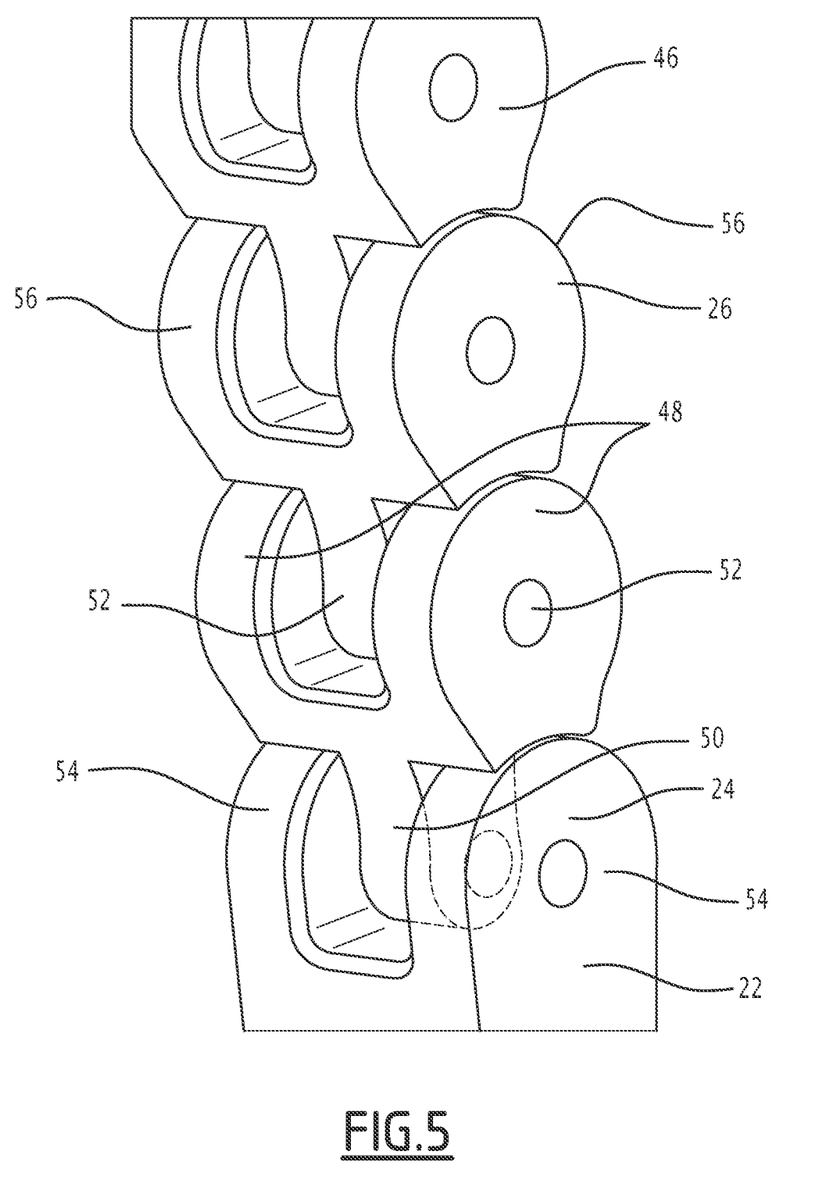
FIG. 5 is a diagrammatic perspective illustration of part of the transfer device of the separating device according to the invention.

As shown in FIG. 5, each link 46 comprises two flanks 48 and a hinge pin 50, the hinge pin 50 of one link 46 being arranged to be received between the two flanks of another adjacent link 46 so as to be articulated around a rotation axis as previously described. The rotation axis and the fastening between the links are for example formed by a slug (not shown) inserted into opposite orifices 52 traversing the flanks 48 and the hinge pin 50.

The hinge pin 50 of the end link articulated to the actuating end 24 of the actuating rod 22 is inserted between two flanks 54 provided at that actuating end and articulated with these flanks, as described above. The two flanks 48 of the end link articulated to the actuating end 32 of the second ejection rod 30 receive a hinge pin between them provided at the actuating end of the second ejection rod 30, this hinge pin being articulated to the two flanks 48, as described above.

Figure 3:
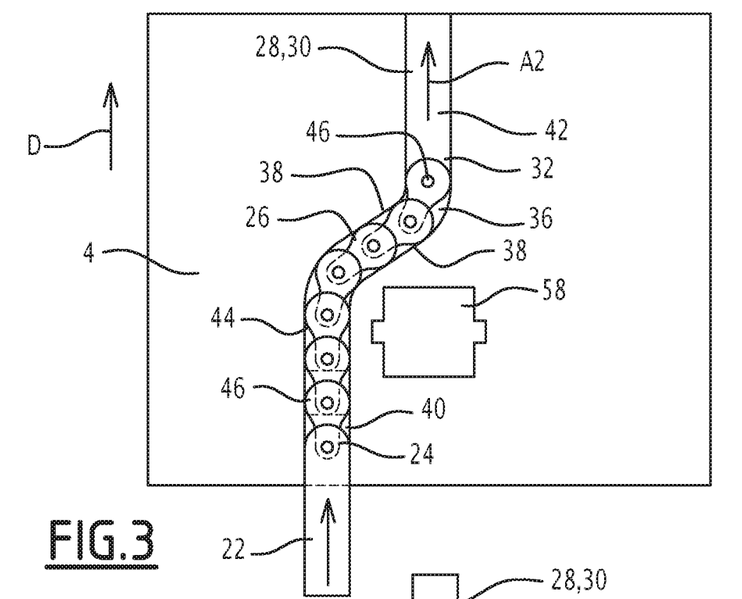
FIG. 3 is a sectional diagrammatic illustration of part of a separating device according to another embodiment.
Figure 4:
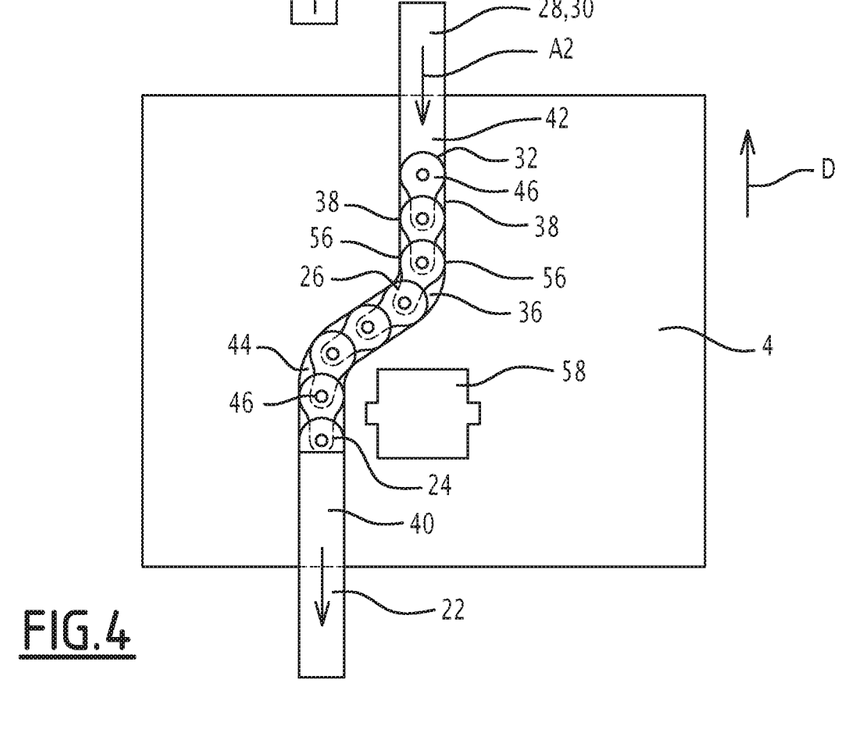
FIG. 4 is a diagrammatic sectional illustration of the part of the separating device of FIG. 3, in a different position.

The links 46 define at least two opposite surfaces 56, for example defined by opposite surfaces of the flanks 48 extending on either side of the rotation axis, sized to be in sliding contact against the opposite walls 38 of the guide element 36, as more particularly visible in FIGS. 3 and 4. The flanks for example have a substantially circular section in a plane perpendicular to the rotation axis such that the diametrically opposite parts of the flanks form the opposite surfaces 56. Such a shape makes it possible to ensure contact with the opposite walls 38 of the guide element 36 when the diameter of the flanks 48 is substantially equal to the distance separating the opposite walls 38. Furthermore, the contact surface between the opposite surfaces 56 and the opposite walls 38 is reduced, which makes it possible to ensure sliding between the opposite surfaces 56 and the opposite walls 38 without risk of blocking of the links in the guide element 36. According to the embodiment shown in FIG. 5, each link 46 comprises four sliding surfaces against the guide element.

The shape of the links 46 described above is given as an example and could be different as long as it allows the links 46 to be articulated to one another and the opposite surfaces allow sliding contact between the links 46 and the opposite walls 38 of the guide element 36. Thus, as an example, each link could comprise only one flank instead of two.

Thus, the links 46 are guided along all of their movements in the guide element 36. In other words, the opposite surfaces 56 of the links 46 in contact with the opposite walls 38 of the guide element 36 make it possible to guarantee permanent guiding of the chain of links 46 in the guide element over the entire movement path of the links 46. In other words, the opposite surfaces 56 are substantially in permanent contact against the opposite walls 38 of the guide element 36 over the entire movement path of the links 46. One thereby avoids any risk of blocking or scratching of the ejection device by blocking of a link 46 in the guide element 46.

The sliding between the links 46 and the opposite walls 38 can be favored by the materials used to produce the opposite surfaces 56 and/or the opposite walls 38 or by a coating of these surfaces and/or walls using a lubricant.

Owing to the transfer system 26, the separating device thus makes it possible to move, by actuating the ejection plate 10 in the direction of the first axis A1, the ejection device 28 along the second axis A2 so as to cause the second ejection rod 30 to protrude from the molding surface 6 in the direction of the axis A2. The transfer device 26 is arranged such that the distance traveled by the second ejection rod 30 along the second axis A2 is substantially equal to the distance traveled by the ejection plate 10 when it is moved along the first axis A1. Thus, when the ejection plate 10 is moved by the distance h making it possible to go from the retracted position to the separated position, the second ejection rod 30 also moves by a distance h. Consequently, if the actuating device comprises a first ejection rod 18, one ensures that the separating distance traveled by the first ejection rod 18 and the second ejection rod 30 is the same.

According to the embodiment shown in FIGS. 1 and 2, the second axis A2 is parallel to the first axis A1 and the transfer device 26 is used to offset the position of the ejection element 28 relative to the ejection plate 10. Such an embodiment is particularly advantageous to eject a large molded article 2 without having to enlarge the ejection plate and therefore the space 12. Consequently, the first part 4 of the mold is more robust because the space 12 does not weaken it and it is able to withstand significant injection pressures. According to this embodiment, the shape of the intermediate segment 44 comprises a curved part connecting it to the upstream segment 40 and a curved part connecting it to the downstream segment 42 and a straight part between the two curved parts, which makes it possible to increase the distance separating the plate 10 from the ejection element 28 without increasing the bulk of the first part 4 of the mold.

According to the embodiment shown in FIGS. 3 and 4, the second axis A2 is also parallel to the first axis A1 and the transfer device 26 is used to bypass an additional element 58 of the mold, such as a transport channel for a heat transfer fluid or the like. In this case, the shape and size of the intermediate segment 44 are arranged to allow this bypass. According to the embodiment shown in FIGS. 3 and 4, the intermediate segment is substantially rectilinear and inclined between the upstream segment 40 and the downstream segment 42.

According to the embodiment shown in FIG. 6, the ejection device comprises several ejection elements 28 and several transfer devices 26 connected to several actuating rods 22 secured to the ejection plate. The second axes A2 are inclined relative to the first axis A1. Such an embodiment makes it possible to eject one or several molded articles 2 with complex shapes while using a single ejection plate 10.

It is understood that the embodiments described above may be combined with one another. Thus, the shape of the guide element 36 depends on the structure of the mold and the shape of the molded article 2 to be produced and can be arranged based on these parameters.

The separating device described above therefore makes it possible to eject large molded articles and/or molded articles with complex shapes without weakening the first part of the mold. Furthermore, the transfer device can be used to adapt the separating device to the structure of the first part of the mold. The chain of links can be modified easily by adding or removing links 46, which are all identical and interchangeable.

The description will now be done in the context of a separating device making it possible to separate a complementary molding element from part of the molded article, as shown in FIG. 7.

In this case, the separating element is formed by the complementary molding element 60 movable along a second axis A2. The rest of the separating device is substantially the same as that described in the context of an ejection device, i.e., it comprises an actuating device 8, movable along a first axis A1, different from the second axis A2, and connected to the complementary molding element 60 by a transfer device 26, comprising a plurality of identical links 46 movable in a guide element 36. Consequently, the similar elements between these separating devices will not be described again.

The complementary molding element 60 is arranged to form, in its retracted position and with the molding surface 6 of the first part 4, a complementary molding cavity in fluid communication with the molding cavity defined between the first and second mold parts. The complementary molding cavity assumes the form of a complementary element 62 formed on the molded article 2 during the production of this molded article 2. The complementary element 62 is for example a screwing shaft provided on the back of the molded article 2. In this case, the complementary molding element for example comprises a pin 64 arranged in the retracted position at the center of a cylinder formed by the molding surface 6 such that the shape of the complementary element 62 is defined between the outer surface of the pin 64 and the inner wall of the cylinder of the molding surface 6. Also in this case, the second axis A2 is parallel to the axis of the cylinder formed by the molding surface 6 and the axis of the pin 64. According to one example, the second axis A2 is the same as the axis of the cylinder and the axis of the pin 64.

When the separating device is moved in the separated position, the complementary molding element 60 is separated from the complementary element 62. Thus, in the case of a screwing shaft, the pin 64 is removed from the complementary element 62 by positioning the pin 64 in the downstream segment 42 of the guide element 36.

The actuating device 8 comprises an actuating element 66 movable in a space 68 in which the upstream segment 40 of the guide element 36 emerges. It should be noted that according to this embodiment, the first axis A1 along which the actuating element 66 moves may be different from the ejection direction of the molded article. Thus, the space 68 and the actuating element 66 can be arranged in part of the first part 4 that may be favorable in terms of bulk and/or arrangement of the actuating means of the actuating element 66. According to the embodiment shown in FIG. 7, the space 68 is thus provided on one side of the first part 4 and the first axis A1 is substantially perpendicular to the opening direction of the mold.

The separating device may be used to bypass an additional element of the mold and/or to allow a movement of the complementary molding element 60 along a direction different from the first axis A1. Thus, according to the embodiment shown in FIG. 7, the second axis A2 is inclined relative to the first axis A1.

In the same way as for an ejection device, the actuating device 8 can be used to move several complementary molding elements along several different second axes A2.

The mold comprising a separating device as described above may also comprise a traditional ejection device 70 or an ejection device as previously described.

The operation of the separating device according to the embodiment described above will now be described.

To produce the molded article 2, the first and second mold parts are placed in the closed position and the separating device is placed in the retracted position. Thus, the molding cavity and the complementary molding cavity are formed and the article 2 can be made with its complementary element 62.

Once the article 2 has been produced, the first and second mold parts are moved toward the open position and the separating device is moved to the separated position by moving the actuating device 8 along the first axis A1. This movement causes the complementary molding element 62 to move along the second axis A2 toward its separated position, in which the complementary molding element 62 is separated from the complementary element 64. The ejection device 70 can then be used to separate the molded article 2 from the molding surface 6 without risking damaging the complementary element 64.

The invention claimed is:

1. A separating device for a mold used to produce a molded article in a molding cavity intended to allow the separation between at least one part of the molded article and at least one part of said molding cavity, said device comprising:
    an actuating device translatable along a first axis between a retracted position and a separated position,
    at least one separating element translatable along a second axis, different from the first axis, between a retracted position and a separated position,
    at least one transfer device connecting the actuating device and the separating element, said transfer device being arranged to move the separating element along the second axis between its retracted position and its separated position when the actuating device is moved along the first axis between its retracted position and its separated position,
    wherein the transfer device comprises at least two articulated links, one of which is attached and articulated to the actuating device and another of which is attached and articulated to the separating element with each link being attached and articulated to another of the links so that the links are rotatable relative to one another and relative to the actuating device and the separating element, and a guide element receiving said links, said links being moved along a movement path in said guide element by the actuating device and moving the separating element, said links being guided in said guide element over the entire movement path wherein each link comprises two flanks and a hinge pin, the hinge pin of one link being received between the two flanks of another link and being articulated to said flanks so as to allow said links to rotate relative to one another.

2. The separating device according to claim 1, wherein the links are identical to one another.

3. The separating device according to claim 1, wherein the transfer device is arranged so that a movement of the actuating device by a given distance along the first axis causes a movement of the separating element by a same distance along the second axis.

4. The separating device according to claim 1, wherein the guide element comprises at least two opposite walls each extending over the movement path.

5. The separating device according to claim 4, wherein the links comprise two opposite surfaces, said opposite surfaces respectively being in permanent contact with the opposite walls of the guide element over the entire movement path such that the links are guided in said guide elements over the entire movement path.

6. The separating device according to claim 1, wherein the first axis and the second axis are substantially parallel to one another or form a non-zero angle relative to one another.

7. The separating device according to claim 1, wherein the guide element comprises an upstream segment extending along an axis substantially parallel to the first axis, a downstream segment extending along the second axis and an intermediate segment extending along a substantially rectilinear and/or curved path between the upstream segment and the downstream segment.

8. The separating device according to claim 1, wherein the actuating device comprises at least one ejection plate and an actuating rod secured at one of its ends to said ejection plate, the opposite end of said actuating rod being articulated to one of the links of the transfer device.

9. The separating device according to claim 8, comprising a plurality of actuating rods secured to the ejection plate, a plurality of separating elements and a plurality of transfer devices connecting said plurality of separating elements to said plurality of actuating rods.

10. The separating device according to claim 1, wherein the separating element is an ejection element intended to allow the molded article to be ejected outside the molding cavity.

11. The separating device according to claim 1, wherein the separating element is a complementary molding element defining part of the molding cavity in the retracted position and intended to form a complementary element on the molded article, said complementary molding element being separated from said complementary element of the molded article in the separated position of the separating element.

* * * * *